United States Patent Office 3,445,383
Patented May 20, 1969

3,445,383
PROCESS FOR TREATING SEWAGE
Roland J. Horvath, South Euclid, Charles G. Parsons, Mentor, and Toby T. Zettler, Shaker Heights, Ohio, assignors to Diamond Shamrock Corporation, a corporation of Delaware
No Drawing. Filed Jan. 28, 1966, Ser. No. 523,524
Int. Cl. C02b *1/36, 3/08*
U.S. Cl. 210—62                                    4 Claims

ABSTRACT OF THE DISCLOSURE

The present invention teaches treatment of sewage effluent with chlorinated glycolurils of the structure:

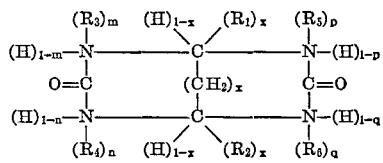

wherein $R_1$ and $R_2$ are lower alkyl radicals from 1 to 4 carbon atoms and $R_3$, $R_4$, $R_5$ and $R_6$ are chlorine and $x$, $m$, $n$, $p$ and $q$ being 1. Preferred compounds used in the process of this invention are 1,3,4,6-tetrachloroglycoluril; 1,5-dimethyl - 2,4,6,8 - tetrachloro - 2,4,6,8 - tetrazabicyclo-(3·3·1)-nonan-3,7-dione and dichloroglycoluril.

---

This invention relates to a method for the treatment of sewage effluent. More particularly, the present invention relates to a method for the chlorination of sewage effluent. The dissolved and suspended organic matter which is permitted to remain in sewage effluent when it is returned to a water course constitutes a serious contaminating influence on that water course. This situation emphasizes a need for improved efficiency of practical sewage treatment processes on an economical basis. A further factor compelling the development of a more efficient and economical sewage treatment process is the present prospect of a growing shortage of fresh water, making it highly desirable that some means be devised by which the water contained in the sewage effluent can be purified and re-used as often as it is necessary.

Chlorination has long been considered to have the greatest practical potential of all disinfecting systems for freeing sewage of pathogens. An extremely powerful disinfectant, chlorine operates against all microorganisms although there are marked variations in susceptibility. The great versatility and reliability of chlorine for protection against pathogens have been amply demonstrated in water supply systems. However, the situation has been very different in sewage chlorination practice. Sewage usually contains many substances that limit the activity of chlorine, and chlorine treatment has been found to be of little or no benefit in many plant operations. By 1957 community waste chlorination practice in the United States had attained the level of approximately 30% of the treatment plants in use in the United States which benefited approximately 50% of the total population of the United States. Of the chlorine employed in 1957, chlorine gas was used by at least 72% of all the plants with chlorination facilities and hypochlorites were used by at least 6.4%. The disinfectant used at the remaining plants was not reported.

Chlorine is an extremely reactive chemical. The utility of chlorine in waste treatment is attributable to its toxilogical characteristics, its oxidative capacity and its adaptability as a coagulant. It irreversibly oxidizes many common inorganic and organic components of sewage and is itself thereby inactivated. It can combine with many of the sewage constituents forming compounds with markedly reduced disinfection activity. Chlorine is employed primarily to inactivate or destroy bacteria and other organisms and to modify the chemical and physical characteristics of the waste being treated.

Sewage wastes contain a large and complex variety of suspended and dissolved inorganic and organic materials in water. Sometimes in addition to a large number and varieties of bacteria, protozoa and other organisms are also present. Chlorine must come in contact with these pathogens to destroy them. Sewage effluent generally is characterized by the presence of chunks and flocs. Organisms within these chunks and flocs are protected and it is thus essential, to achieve proper chlorination of the sewage, to disperse these particulate materials or remove them prior to chlorination. Usually, settling is utilized to remove these particles from sewage before chlorination. Unstable organic substances normal to sanitary wastes comprise the bulk of settleable and non-settleable suspended solids. The removal of settleable organic solids along with stable settleable inorganic materials, such as sand, grit, etc., present no serious operational problem in waste treatment although the former exert a substantial chlorine demand until their separation is accomplished. The removal of non-settleable colloidal solids that are chiefly of organic composition is more challenging and many such materials exert a very substantial chlorine demand in the process of chlorine absorption and formation of chlorine addition products. For instance, when sufficient chlorine is added to domestic sewage to carry the oxidation reaction to an equilibrium in a ten minute reaction period, the non-settleable solids, principally unstable organics but also including some finely-divided inorganics, consume about 50% of the chlorine added. The settleable and soluble substances, for instance unstable organics and stable inorganics, each consume about 25% of the chlorine added. Only a negligible amount of chlorine is consumed by bacterial cells and higher biological forms.

The amount of chlorine required to carry chloroxidation and addition reactions to equilibrium in any given time interval is a function of the concentration and type of oxidizable and chlorine-absorbing materials present. Thus, the chlorine required to reach equilibrium or completion of reaction in a given time interval is a measure of the concentration of such materials present in the waste. Like any other chemical reactions, the activity of chlorine dissolved in liquid waste is dependent on such factors as temperature and pH. Increasing temperature and hydrogen ion concentration accelerates chemical reactions. The speed and completeness of oxidation also is governed by the law of mass action, thus the concentration of chlorine, chloramines (the reaction product of chlorine with the ammonia in the sewage effluent) and oxidizable substances control the mechanism of the reaction and the types of end-product formed. Accordingly, to achieve effective chlorination of sewage effluent the choice of the particular chlorine containing compound is important.

It has now been found that chlorine substituted glycoluril compounds, as described hereinbelow, provide satisfactory long term, maintenance free disinfection of sewage effluent. The compound which may be employed for the treatment of sewage effluent are represented by the structure:

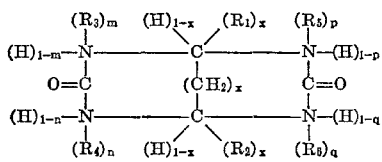

wherein $R_1$ and $R_2$ are lower alkyl radicals from 1 to 4 carbon atoms and $R_3$, $R_4$, $R_5$ and $R_6$ are chlorine and $x$, $m, n$, $p$ and $q$ are each integers from 0 to 1, inclusive, with at least one of $m$, $n$, $p$ and $q$ being 1. In most instances $R_1$ and $R_2$ are the same or different lower alkyl groups such as methyl group or other alkyl groups containing up to 4 carbon atoms, since as the chain length increases the compound generally shows less solubility in water and often is more difficult to prepare.

Specific illustrative compounds of the above chlorine substituted glycoluril compounds include 1,3,4,6-tetrachloroglycoluril having the structure:

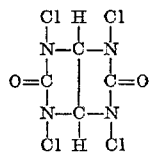

1,5-dimethyl-2,4,6,8-tetrachloro - 2,4,6,8 - tetrazabicyclo- (3.3.1)-nonan-3,7-dione having the structure:

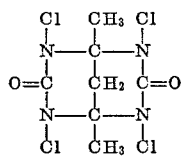

and dichloroglycoluril having the structure:

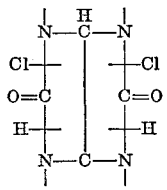

These compounds have a high available chlorine content which exhibit over prolonged periods of time excellent disinfecting properties for the treatment of sewage effluent. Of particular interest is 1,3,4,6-tetrachloroglycoluril, which has been found to exhibit excellent disinfectant characteristics on the treatment of sewage effluent within acceptable limits of health and sanitation standards.

The use of the chlorine substituted glycolurils, which are normally solid materials, inherently provides a significant improvement over many chlorine-containing disinfecting agents used heretofore. Moreover, the fact that these compounds are solids provides increased convenience by way of easier handling and affords the use of less complicated and more easily operated chlorinator system. As mentioned previously, these compounds are characterized by a higher chlorine content than other halogenated compounds presently being employed in the treatment of sewage effluent. Since the compounds of this invention exhibit a rate of dissolution which is somewhat slower than other halogenated organic compounds, they can be contacted with the sewage effluent and dissolved at a rate which provides a closely regulated constant percentage of chlorine to the sewage effluent over a longer period of time without adding to or replenishing the treating chemical. For instance, the chlorine-substituted glycolurils are more stable in an aqueous medium than the halogenated unsubstituted and alkyl substituted hydantoins; that is to say, the residual chlorine supplied by the chlorine-substituted glycolurils is dissipated more slowly than that supplied by this other halogenated organic disinfectant. Therefore, the chlorine so supplied is available for a longer period of time and its bactericidal and disinfecting activity is more continuously effective when applied in the amounts required for satisfactory disinfecting levels to provide residual chlorines in the chlorinated sewage effluent. The high total chlorine content of the glycoluril compounds thus allows for satisfactory disinfecting levels even at peak periods of sewage effluent discharge by using these chlorine-substituted glycolurils in minimum quantities.

Generally, to prepare the chlorine-substituted glycolurils a glycoluril or an alkyl-substituted glycouril is chlorinated in an aqueous medium in the presence of an inorganic acid-binding alkali metal compound. The alkali metal compound is desirably selected from alkali metal carbonates, e.g., sodium carbonate; alkali metal bicarbonates, e.g., sodium bicarbonate; alkali metal borates, e.g., sodium borate; alkali metal silcates, e.g., sodium metasilicate; and alkali metal hydroxides, e.g., sodium hydroxide; and is preferably added to the aqueous medium in sufficient quantity to render it alkaline. Preferably an alkali metal bicarbonate is used.

The chlorine-substituted glycolurils are preferably used in the form of compressed rods or sticks since these materials afford a more even surface area in contact with the sewage effluent. They are more convenient to handle, are easier to confine and the possibility of such solids being flushed from the contact chamber is very remote. Additionally, the compound rods are very difficult to break and do not dust in shipment or in storage. To fabricate the chlorine-substituted glycolurils into rods it has been found very satisfactory to thoroughly mix the dry compound with a sufficient quantity of water to form a damp but free flowing powder mixture. A typical mix is comprised of about 25% to 30% water. The binding process is accomplished at room temperature using as an apparatus any blade-type mixer of low shearing speed, for example, a ribbon blade mixer. The powder mix prepared is thereafter passed through a plasticizing extruder, preferably fitted with corrosion resistant parts in contact with the mix and converted to a soft coherent plastic mass. This material is then passed through a finishing extruder and the damp coherent extrudate is broken up into rods about 2 to 3 inches in length and about 1 inch in diameter. The formed rods are then air dried or oven dried at a temperature of about 80° C.

Another method which may be employed to fabricate the compounds of this invention into conveniently applied shapes in the form of solid or hollow cylinders of various design to provide a different surface area for use with varying sewage treatment systems. The shapes of the chlorine-substituted glycolurils may be fabricated so that a satisfactory halogen concentration may be maintained constantly in the treated water at a constant rate and/or a variable rate.

Since the chlorine-substituted glycolurils also exhibit substantial algicidal and slime control activity, it is not necessary to add additional compounds normally used as algicides or slime control agents to the chlorine-substituted glycolurils. However, if it is desired to employ such other compounds, the chlorine-substituted glycolurils of this invention are completely compatible with these materials.

In the treatment of sewage effluent the coliform density remaining after chlorine treatment is an accepted index of its effect. Because sewage effluent generally is discharged into receiving waters where dilution and some degree of natural purification are offered, complete coliform destruction is not the usual treatment objective. The degree of bacterial destruction and the effective chlorine dosage are largely determined by the characteristics and subsequent uses of the receiving water body and discharge restrictions that might be imposed by requirements of local authorities. Only broad generalizations can be made regarding chlorine requirements for disinfection of the sewage effluent.

In the treatment of sewage effluent care must be exercised to select the point or points of application for the position of the contact chamber containing the chlorine-substituted glycoluril compound to accomplish the above objectives as efficiently as possible without interference with the action of the saprophytic organisms essential to aerobic or anaerobic purification processes. Flexibility of operation should be provided so that chlorine can be applied whenever it can best accomplish the desired objective. When that objective is primarily disinfection, prechlorination and/or post-chlorination may be employed. Up-sewer chlorination, that is, ahead of the treatment plant, should be employed for disinfection only in those instances where subsequent treatment is limited to screening. When secondary waste treatment is provided, post-chlorination is practiced when disinfection is indicated. In the practice of the present invention the chlorine contact chamber is preferably positioned just prior to the treating unit's sewage discharge outlet.

In general, the treatment of sewage effluent involves the preliminary removal of large or gross solids by passing the raw sewage through a screening arrangement. Afterwards, grit and other mineral and inorganic settleable solids are customarily removed by passing the screened raw sewage at a carefully controlled velocity through sedimentation tanks designed to drop out such impurities. Grease and oil can be removed from the raw sewage by top skimming operation often carried out in conjunction with bottom skimming or settling step which removes the grit. The raw sewage from which the gross solids, grit, grease and oil have been removed generally is now subjected to a primary sedimentation in order to remove a substantial proportion of the suspended organic solids. The primary sedimentation step generally results in a significant reduction in the strength or quality of the sewage since the suspended solids so removed constitute a significant proportion of the organic matter present in the sewage.

Following primary sedimentation, the sewage may then be subjected to an aerobic biological treatment which is intended to remove the dissolved organic matter as well as and remaining suspended organic matter. This aerobic biological treatment can consist in subjecting the sewage to one or a combination of two specific treatments, namely, (1) passing the settled sewage through so-called percolating filters containing well-graded media wherein the sewage is subjected to the action of bacteria and other microorganisms in the presence of sufficient air and/or (2) aerating a mixture of settled sewage in a special bacteriologically active sludge. The latter process is the so-called "activated sludge process."

Following the aerobic biological treatment, any additional solids introduced by passage through the percolated filter or by the activated sludge process are removed by further settling. Generally, it is at this point that chlorination of the treated sewage is effected before returning the sewage effluent to the water course. The inclusion or deletion of any of the foregoing treatment steps will depend upon the water course to which the sewage effluent is returned and standards established for that particular area.

In order that those skilled in the art may better understand the present invention and the preferred method by which it may be practiced, the following specific examples are offered.

EXAMPLE 1

To a single home extended aeration three-compartment treatment unit having a capacity of 1100 gallons with a retention time of 24 hours, is connected a contact chamber into which the sewage effluent from the aeration chamber is introduced. The contact chamber is charged with 20 pounds of 1,3,4,6-tetrachloroglycoluril. The sewage treatment plant serves a population equivalent of 6 people and after operation for approximately 168 days one sample is taken of the sewage effluent prior to chlorination and another sample taken immediately after passing through the tetrachloroglycoluril. Of the original 20-pound charge 14.5 pounds are consumed. These samples are evaluated by the fundamental tests of (1) the determination of the amount of suspended solids in the sewage effluent (Suspended Solids Tests), (2) the determination of the total amount of organic matter, both suspended and dissolved, present in the sewage effluent [Biochemical Oxygen Demand (B.O.D.)] and (3) E. Coliform index. Details concerning the conventional standard procedures for carrying out the determinations found in Table I may be found in the "Standard Methods for the Examination of Water, Sewage and Industrial Waste," published by the American Public Health Association, 12th edition (1965). Analysis of the prechlorinated effluent and the post-chlorinated effluent are presented in Table I.

TABLE I

| | Results |
|---|---|
| Biochemical Oxygen Demand (B.O.D.), p.p.m.: | |
| Pre-chlorination | 40 |
| Post-chlorination | 5.4 |
| Dissolved oxygen, p.p.m.: | |
| Pre-chlorination | 2.6 |
| Post-chlorination | 2.4 |
| E. coli index per 100 ml.: | |
| Pre-chlorination | 350,000 |
| Post-chlorination | 60 |
| Available chlorine, p.p.m.: | |
| Pre-chlorination | — |
| Post-chlorination | 5.1 |
| pH: | |
| Pre-chlorination | 7.40 |
| Post-chlorination | 7.45 |
| Suspended solids, p.p.m.: | |
| Pre-chlorination | 74 |
| Post-chlorination | 70 |

EXAMPLE 2

To the chlorine contact chamber of a single-house sewage treatment unit similar to the one described in Example 1 and also servicing a population equivalent to six people, is initially charged 15 pounds of 1,3,4,6-tetrachloroglycoluril. A series of samples are taken over a period of time.

After the 116th day, it is ascertained that of the original 15-pound charge of 1,3,4,6-tetrachloroglycoluril, 13.25 pounds were consumed during this period. At this time, the original charge depleted to 1.75 pounds is brought up to 15 pounds. Two further samples are taken after re-charging and are designated the samples for the 169th and 197th days in Table II. These results are presented in Table II, below.

TABLE II

|  | 18th day | 22d day | 56th day | 60th day | 70th day | 116th day | 169th day | 197th day |
|---|---|---|---|---|---|---|---|---|
| Biochemical Oxygen Demand (B.O.D.), p.p.m.: | | | | | | | | |
| Pre-chlorination | 114 | 70 | 29 | 32 | 14.0 | 21 | 56 | 35.8 |
| Post-chlorination | 52 | 31 | 3.6 | 7.5 | 7.2 | 19 | 17 | 26.2 |
| Dissolved Oxygen, p.p.m.: | | | | | | | | |
| Pre-chlorination | 4.3 | 7.0 | 3.20 | 4.30 | 4.0 | 4.2 | 5.0 | 5.1 |
| Post-chlorination | 2.9 | 9.3 | 3.00 | 3.00 | 6.8 | 2.2 | 2.5 | 6.1 |
| E. coli Index per 100 ml.: | | | | | | | | |
| Pre-chlorination | 280,000 | 180,000 | 3,300,000 | 1,900,000 | 460,000 | 8,400,000 | 910,000 | 3,300,000 |
| Post-chlorination | 20 | 30 | 0 | 0 | 0 | 0 | 1,200 | 500 |
| Suspended solids, p.p.m.: | | | | | | | | |
| Pre-chlorination | 62 | 31 | 76 | 76 | 78 | 80 | 46 | 60 |
| Post-chlorination | 48 | 60 | 76 | 128 | 116 | 86 | 56 | 60 |
| Total Available Chlorine, p.p.m.: | | | | | | | | |
| Pre-chlorination | | 0 | 0 | 0 | 0 | 0 | 0 | 0 |
| Post-chlorination | 8.22 | 8.9 | 10.1 | 7.2 | 5.3 | 5.6 | 4.9 | 8.4 |
| pH: | | | | | | | | |
| Pre-chlorination | 7.95 | 7.75 | 7.5 | 7.15 | 7.4 | 7.35 | 7.5 | 7.45 |
| Post-chlorination | 7.80 | 7.15 | 7.4 | 7.65 | 6.9 | 7.30 | 7.4 | 7.45 |

EXAMPLE 3

To a single-home sewage home treatment unit similar to the one described in Example 1 is charged 20 pounds of 1,3,4,6-tetrachloroglycoluril. Samples are taken, as in Example 1, on the 100th and 129th day after this charge. Analyses of these samples are presented in Table III, below.

TABLE III

|  | Day | |
|---|---|---|
|  | 100th | 129th |
| Biochemical Oxygen Demand (B.O.D.), p.p.m.: | | |
| Pre-chlorination | 46 | 25 |
| Post-chlorination | 32 | 21 |
| Dissolved Oxygen, p.p.m.: | | |
| Pre-chlorination | 5.8 | 4.7 |
| Post-chlorination | 5.8 | 8.0 |
| E. coli Index per 100 ml.: | | |
| Pre-chlorination | 180,000 | 8,000 |
| Post-chlorination | 700 | 0 |
| Suspended Solids, p.p.m.: | | |
| Pre-chlorination | 92 | 8 |
| Post-chlorination | 74 | 3 |
| Total Available Chlorine, p.p.m.: | | |
| Pre-chlorination | 0 | 0 |
| Post-chlorination | 1.1 | 2.45 |
| pH: | | |
| Pre-chlorination | 7.15 | 7.40 |
| Post-chlorination | 7.20 | 7.6 |

EXAMPLE 4

To an extended aeration package plant having a designed capacity of 10,000 gallons per day is connected a chlorine contact chamber. To this chamber is charged 20 pounds of 1,3,4,6-tetrachloroglycoluril. Each of the post-chlorination samples taken are subjected to a contact time with the tetrachloroglycoluril for a period of between 60 and 90 seconds. An analysis of each of the samples taken is presented in Table IV.

The kill rate of the total bacteria and E. coli on a sample from the package treatment plant shows that more than 99% bacteria kill is attained in less than 12 minutes at available chlorine levels of 0.5 to 3 p.p.m. The residual chlorine ranges from 2.2 to 3.0 p.p.m. The temperature is 77° F. These data are presented in Table V, below.

TABLE V

|  | Percent Organisms Remaining | |
|---|---|---|
| Contact Time (Min.) | Total Bacteria | E. coli |
| 1 | 13.0 | 5.00 |
| 2 | 5.50 | 2.20 |
| 3 | 1.90 | 1.50 |
| 4 | 1.00 | 1.00 |
| 5 | 0.30 | 0.60 |
| 6 | 0.18 | 0.38 |
| 7 | 0.15 | 0.15 |
| 8 | 0.13 | 0.00 |
| 9 | 0.12 |  |
| 10 | 0.11 |  |
| 11 | 0.11 |  |

Additional bacteriological data are obtained on another sample taken from this package treatment plant by studying the reduction of Salmonella typhimurium and the Enterococci group (Streptococcus). The contact time ranges from 60 to 90 seconds at an available chlorine level of 0.4 to 1.0 p.p.m. These results are presented in Table VI, below.

TABLE VI

| Organisms | Sample | Analyses | Percent Kill |
|---|---|---|---|
| Salmonella typhimurium | Pre-chlorination | 1,166 |  |
|  | Post-chlorination | 300 | 74 |
| Enterococci | Pre-chlorination | 24,866 |  |
|  | Post-chlorination | 5,933 | 76.1 |

As can be readily seen from the data presented in the above examples, the use of chlorinated glycoluril compounds as a treatment agent for sewage effluent effectively reduces deleterious organisms in the waste materials.

It is understood that although the invention has been described with specific reference to particular embodiments thereof it is not to be so limited since changes and

TABLE IV

|  | 5th day | 6th day | 14th day | 36th day | 75th day | 104th day |
|---|---|---|---|---|---|---|
| Biochemical Oxygen Demand (B.O.D.), p.p.m.: | | | | | | |
| Pre-chlorination | 9.0 | 18.6 | 3.6 | 7.0 | 2.4 | 10.8 |
| Post-chlorination | 3.0 | 16.8 | 4.2 | 5.0 | 1.2 | 5.2 |
| Dissolved Oxygen, p.p.m.: | | | | | | |
| Pre-chlorination | 4.2 | 1.5 | 4.5 | 4.0 | 1.0 | 1.1 |
| Post-chlorination | 6.2 | 2.5 | 5.9 | 3.9 | 1.9 | 3.4 |
| E. coli Index per 100 ml.: | | | | | | |
| Pre-chlorination | 2,700 | 130,000 | 11,000 | 28,000 | 8,800 | 400 |
| Post-chlorination | 0 | 6,000 | 1,300 | 0 | 400 | 0 |
| Suspended Solids, p.p.m.: | | | | | | |
| Pre-chlorination | 58 | 26 | 28 | 20 | 34 | 25 |
| Post-chlorination | 30 | 652 | 10 | 20 | 24 | 12 |
| Total Available Chlorine, p.p.m.: | | | | | | |
| Pre-chlorination | 0.0 | 0 |  |  |  |  |
| Post-chlorination | 2.1 | <0.1 | 0 | 0 | 0 | 0 |
|  |  |  | 6.3 | 0.7 | <0.1 | 1.4 |
| pH: | | | | | | |
| Pre-chlorination | 7.6 | 7.35 | 7.45 | 7.3 | 6.9 | 6.95 |
| Post-chlorination | 7.65 | 7.30 | 7.35 | 7.3 | 7.0 | 7.10 |

What is claimed is:
1. A process for the treatment of sewage effluent which comprises contacting said effluent with a bactericidal amount of a compound having the structure

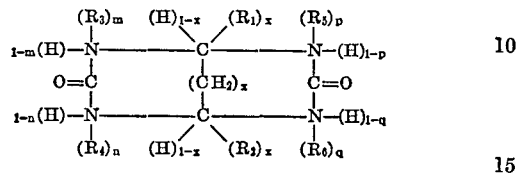

wherein $R_1$ and $R_2$ are lower alkyl; $R_3$, $R_4$, $R_5$ and $R_6$ are chlorine; and $x$, $m$, $n$, $p$ and $q$ are each numbers from 0 to 1, inclusive, with the further proviso that at least one of $m$, $n$, $p$ and $q$ is 1, for a sufficient period of time so that the chloroxidation reaction reaches equilibrium in up to 10 minutes, thus effecting reduction in the presence of undesired bacteria in said effluent.

2. The method of claim 1 wherein the compound is 1,3,4,6-tetrachloroglycoluril.

3. The method of claim 1 wherein the compound is 1,5 - dimethyl - 2,4,6,8 - tetrachloro - 2,4,6,8 - tetrazabicyclo(3.3.1)-nonan-3,7-dione.

4. The method of claim 1 wherein the compound is dichloroglycoluril.

References Cited

UNITED STATES PATENTS

| | | | |
|---|---|---|---|
| 3,147,219 | 9/1964 | Paterson | 210—62 |
| 3,165,521 | 1/1965 | Slezak et al. | 210—62 X |
| 3,205,229 | 9/1965 | Matzner | 210—62 X |
| 3,252,901 | 5/1966 | Zettler | 210—62 |

MICHAEL E. ROGERS, *Primary Examiner.*

U.S. Cl. X.R.

167—33; 260—256.4